Patented May 28, 1940

2,202,029

UNITED STATES PATENT OFFICE 2,202,029

METHOD OF SEPARATING HORMONES FROM BIOLOGICAL MATERIALS

Manasseh G. Sevag, Philadelphia, Pa., assignor to Schering Corporation, Bloomfield, N. J., a corporation of New Jersey No Drawing. Application October 8, 1937, Serial No. 168,086

9 Claims. (Cl. 167—74)

This invention relates to a method for separating biologically valuable constituents from starting materials of vegetable or animal origin containing proteins, and the present application is a continuation-in-part of my copending application Ser. No. 23,337, filed May 24, 1935 now Patent No. 2,118,117, dated May 24, 1938.

In said application, I have set forth that in the prior art the separation of certain of the constituents from vegetable or animal materials has been accomplished with difficulty and with large losses. According to the present invention, it is possible to treat such starting material by physical methods so as to obtain a separation of various biologically valuable constituents without such losses and in a simple manner.

In my copending patented application, I have described in general the application of the invention to various materials for the production of various products and in the present application there is described the separation of hormones or substances having the physiological effects of those substances which are present in the anterior petuitary gland, such as the thyreotropic and the gonadotropic hormones, and the like. The biological starting materials from which the said hormones are separated may be the anterior pituitary gland, the urine of pregnant individuals, the blood or blood serum of pregnant individuals, and others. In particular, it has been found that the blood serum of pregnant mares is especially valuable because of the relatively higher concentration therein of the said hormones.

The present invention is based upon the discovery that vegetable and animal material containing proteins and biologically valuable substances such as hormones may be treated in such a manner as to separate said hormones without substantial damage to or destruction of said valuable substances. The treatment contemplated herein includes the separation of the proteins by means of water and water-immiscible liquid substances, causing the formation of a plurality of phases.

The water-immiscible substances are those which are capable of forming gels with proteins in the presence of water. Gel formation may take place by mere contact, but for practical purposes it is necessary to shake the starting materials, water and the organic substances, sufficiently vigorously to form a combination containing the proteins. Such organic water-immiscible substances on being mixed and shaken with aqueous solutions containing protein, hormones, etc. combines with the protein alone probably forming a molecular compound in the form of a gel which separates out gradually on standing, or immediately on centrifuging. This process is based on an entirely new mild reaction between the protein and the water immiscible organic liquid. Protein is not dissolved in the organic solvent, hence the present process is not an extraction process.

The general method involved in the present invention is very simple. One takes the starting material, as, for instance, a serum or comminuted material, adds water and said organic liquid, and subjects the same to agitation for a suitable length of time whereby there is caused a sufficiently stable combination between the organic liquid and the protein substances present in the starting materials, which may be termed a gel, which separates from the remaining materials. Usually, three layers are formed, the one layer being of the organic liquid if an excess thereof is present, the other layer containing the water, and an intermediate layer of the aforesaid gel. The gel may be separated from the other layers by decantation, filtration, centrifuging, or the like. It is sufficiently stable as not to be separable into its constituents by centrifugal action.

If cellular material is used, it is generally necessary to treat the same in such a manner as to break up the cells and to release the hormones therefrom. This may be accomplished by various methods, as by treatment of the material at low temperature at or below the freezing point of water, and preferably at very low temperatures such as that of carbon dioxide snow or liquid air. Upon drastic freezing and then thawing, the cells are effectively broken up, making the hormones available for isolation. Other methods of pretreatment, such as irradiation, or known physical methods may be used.

The following example illustrates the present invention:

The blood of pregnant mares is first treated as is well known to separate the blood serum from the remaining constituents. An equal volume of chloroform is added to the solution and the mixture is thoroughly and vigorously shaken for from one to two hours. Upon standing the mass separates into three layers, the lower layer being chloroform, the upper layer being water, having in solution the desired hormones, and the intermediate layer being a molecular combination of chloroform and protein in the form of a semi-solid mass or gel. The water layer is separated and the hormone content recovered from the solution. This separation may be accomplished in any usual manner, as for example, the well known method of precipitation by adding an organic solvent to the water solution, for instance, alcohol, whereby the hormones are rendered insoluble, as set forth in said Patent No. 2,118,117. The activity of the hormone is at least from five to ten times the activity of the starting material.

The said hormones obtained as above described are of considerable value therapeutically. On injection thereof into the human body they stimulate the action of the body in the production of the sex hormones. They also supply deficiency of gonadotropic and thyreotropic hormones in the body, besides having other desirable physiological effects.

While I have described my invention setting forth a single specific embodiment thereof, the example given above was intended to illustrate the invention and not to limit it. It will be obvious to those skilled in the art that various other starting materials may be used in carrying out the principles set forth herein. In some cases a preliminary treatment of the starting material may be utilized, and if desired, it may be subjected to say a grinding operation or to a chemical treatment for breaking up cell structure, or to solvents for dissolving out among other substances desired protein-like hormones. The preliminary treatment may be at higher temperatures than those of liquid air, as, for instance, as high as −60° C., causing aqueous suspensions of finely divided starting material to rapidly freeze, rupturing the cells, and thereupon thawing the same.

In the specific example I have set forth the use of chloroform, but other water-immiscible organic liquids having the desired properties as set forth above may be used, such as various halogenated aliphatic hydrocarbons and particularly chlorinated hydrocarbons having from 1 to 8 carbon atoms, such as tetra- and hexa-chloro ethylenes. Also suitable are high boiling fractions obtained from mineral oils and various other indifferent organic solvents and mixtures thereof may be used. The use of the expression "water-immiscible organic liquids" concerns those which enter into union with proteins through mutual valence or surface forces forming water insoluble molecular compounds which separate out from the original solution or suspension. In connection with this invention the term "water-immiscible liquids" does neither infer nor necessitate the use or application of their solvent properties. It refers simply to chemical reagents employed for an entirely different and new purpose—namely, to form water-insoluble molecular compounds with another substance, such as protein.

Although I have set forth specifically the recovery of the hormones in combination with the organic liquid, other constituents of the starting materials may also be recovered simultaneously therewith in the other layers formed in the process. My invention contemplates shaking an aqueous solution or suspension of animal and vegetable materials with such organic water-immiscible liquids which have the property of entering into combination with protein to form insoluble molecular compounds, usually of gel-like consistency. It is not essential to the process that three layers be formed as the third layer consists of excess organic liquid, and if it be present not in excess, no third layer is formed. The operation may be performed either in the presence or absence of air, and an inert atmosphere may be used in the case of unstable biological products. Therefore, my invention is to be construed broadly and not to be limited except by the character of the claims appended hereto.

What I claim is:

1. A method of treating biological materials containing among other substances hormones having physiological effects of those present in the anterior pituitary gland to separate the same from other constituents including proteins which comprises agitating said materials with water and an organic water-immiscible liquid capable of combining with protein to cause the formation of a plurality of layers, one of which contains a water solution of said hormones.

2. A method of treating biological materials containing among other substances hormones having physiological effects of those present in the anterior pituitary gland to separate the same from other constituents including proteins which comprises agitating said materials with water and an organic water-immiscible halogenated aliphatic hydrocarbon capable of combining with protein to cause the formation of a plurality of layers, one of which contains a water solution of said hormones.

3. A method of treating biological materials containing among other substances those taken from the class consisting of thyreotropic and gonadotropic hormones to separate the same from other constituents including proteins which comprises agitating said materials with water and an organic water-immiscible liquid capable of combining with protein to cause the formation of a plurality of layers, one of which contains a water solution of said hormones.

4. A method of treating biological materials containing among other substances hormones having physiological effects of those present in the anterior pituitary gland to separate the same from other constituents including proteins which comprises subjecting said materials to a preliminary treatment to physically free said substances from associated materials, agitating said materials with water and an organic water-immiscible liquid capable of combining with proteins to cause the formation of a plurality of layers, one of which contains a water solution of said hormones.

5. A method of treating biological materials taken from the class consisting of anterior pituitary gland and urine and blood serum of pregnant individuals, containing among other substances hormones having physiological effects of those present in the anterior pituitary gland to separate the same from other constituents including proteins which comprises agitating said materials with water and an organic water-immiscible liquid capable of combining with protein to cause the formation of a plurality of layers, one of which contains a water solution of said hormones.

6. A method of treating biological materials containing among other substances hormones having physiological effects of those present in the anterior pituitary gland to separate the same from other constituents including proteins which comprises agitating said materials with water and an organic water-immiscible liquid capable of combining with protein to cause the formation of a plurality of layers, one of which contains a water solution of said hormones, said agitation being carried on for a sufficient length of time with sufficient vigor to form a liquid-protein combination in the form of a gel which is stable and may be separated by centrifuging without decomposition.

7. A method of treating biological materials containing among other substances those taken from the class consisting of thyreotropic and gonadotropic hormones to separate the same from other constituents including proteins which comprises agitating said materials with water and an organic water-immiscible liquid capable of combining with protein to cause the formation of a plurality of layers, one of which contains a water solution of said hormones, said agitation being carried on for a sufficient length of time with sufficient vigor to form a liquid-protein combination in the form of a gel which is stable and may be separated by centrifuging without decomposition.

8. A method of treating biological materials taken from the class consisting of anterior pituitary gland and urine and blood serum of pregnant individuals, containing among other substances hormones having physiological effects of those present in the anterior pituitary gland to separate the same from other constituents including proteins which comprises agitating said materials with water and an organic water-immiscible liquid capable of combining with protein to cause the formation of a plurality of layers, one of which contains a water solution of said hormones, said agitation being carried on for a sufficient length of time with sufficient vigor to form a liquid-protein combination in the form of a gel which is stable and may be separated by centrifuging without decomposition.

9. A method of treating biological materials containing among other substances hormones having physiological effects of those present in the anterior pituitary gland to separate the same from other constituents, including proteins, which comprises agitating said materials with water and an organic water-immiscible high boiling fraction of mineral oil capable of combining with protein to cause the formation of a plurality of layers, one of which contains a water solution of said hormones.

MANASSEH G. SEVAG.